United States Patent
Fleuriot et al.

(10) Patent No.: US 10,072,515 B2
(45) Date of Patent: Sep. 11, 2018

(54) FRAME SEGMENT FOR A COMBUSTOR TURBINE INTERFACE

(71) Applicant: Ansaldo Energia Switzerland AG, Baden (CH)

(72) Inventors: Fabien Fleuriot, Rosenau (FR); Hans-Christian Mathews, Zurich (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 0 days.

(21) Appl. No.: 14/948,846

(22) Filed: Nov. 23, 2015

(65) Prior Publication Data

US 2016/0153292 A1    Jun. 2, 2016

(30) Foreign Application Priority Data

Nov. 27, 2014   (EP) .................................... 14195266

(51) Int. Cl.
| | |
|---|---|
| F01D 9/02 | (2006.01) |
| F01D 25/12 | (2006.01) |
| F01D 25/04 | (2006.01) |
| F01D 25/28 | (2006.01) |
| F02C 3/04 | (2006.01) |

(52) U.S. Cl.
CPC ............. F01D 9/023 (2013.01); F01D 25/04 (2013.01); F01D 25/12 (2013.01); F01D 25/28 (2013.01); F02C 3/04 (2013.01); F05D 2220/32 (2013.01); F05D 2240/24 (2013.01); F05D 2240/35 (2013.01); F05D 2260/20 (2013.01);

(Continued)

(58) Field of Classification Search
CPC . F01D 9/02; F01D 25/28; F01D 25/04; F01D 25/12; F01D 9/023; F02C 3/04; F02C 7/12; F02C 7/18; F02C 7/24; F02C 7/20; F23R 2900/00014; F23R 2900/03044;

(Continued)

(56) References Cited

U.S. PATENT DOCUMENTS

| | | | |
|---|---|---|---|
| 6,450,762 B1 * | 9/2002 | Munshi ................... | F01D 9/023 415/138 |
| 2006/0288707 A1* | 12/2006 | Weaver ................... | F01D 9/023 60/796 |

(Continued)

FOREIGN PATENT DOCUMENTS

| | | |
|---|---|---|
| EP | 0 620 363 A1 | 10/1994 |
| EP | 0 718 470 A2 | 6/1996 |

(Continued)

OTHER PUBLICATIONS

European Search Report dated May 15, 2015 for Application No. 14195266.3.

*Primary Examiner* — Craig Kim
(74) *Attorney, Agent, or Firm* — Buchanan Ingersoll & Rooney PC

(57) ABSTRACT

The disclosure relates Frame segment for a transition piece-turbine interface having a picture frame receptacle for axially receiving an aft end of a combustor transition piece. The frame segment can include an I-beam with an upper horizontal element, a lower horizontal element, and a vertical web, wherein the upper horizontal element has mounting face for fixation to a vane carrier. The vertical web has a downstream face, facing towards a first stage of a turbine when installed in a gas turbine. The vertical web includes a cooling gas duct for supplying cooling gas to the downstream face of the vertical web.

20 Claims, 5 Drawing Sheets

(52) U.S. Cl.
CPC .. *F05D 2260/201* (2013.01); *F05D 2260/202* (2013.01); *F05D 2260/203* (2013.01); *F05D 2260/231* (2013.01); *F05D 2260/963* (2013.01); *F05D 2300/502* (2013.01); *F05D 2300/611* (2013.01)

(58) Field of Classification Search
CPC ..... F23R 2900/03041; F05D 2260/201; F05D 2260/203; F05D 2260/963
See application file for complete search history.

(56) References Cited

U.S. PATENT DOCUMENTS

| | | | |
|---|---|---|---|
| 2007/0017225 A1 | 1/2007 | Bancalari et al. | |
| 2009/0115141 A1 | 5/2009 | Simmons | |
| 2011/0171013 A1* | 7/2011 | Arzel | F01D 5/08 415/180 |
| 2011/0179796 A1* | 7/2011 | Magni | F23R 3/00 60/725 |
| 2011/0308630 A1* | 12/2011 | Huber | F23M 20/005 137/14 |
| 2012/0234018 A1 | 9/2012 | Cihlar et al. | |
| 2014/0000265 A1* | 1/2014 | Simo | F01D 9/023 60/752 |
| 2014/0000267 A1 | 1/2014 | Melton | |

FOREIGN PATENT DOCUMENTS

| | | |
|---|---|---|
| EP | 2 500 523 A2 | 9/2012 |
| EP | 2 679 775 A1 | 1/2014 |
| WO | WO 2012/136787 A1 | 10/2012 |

* cited by examiner

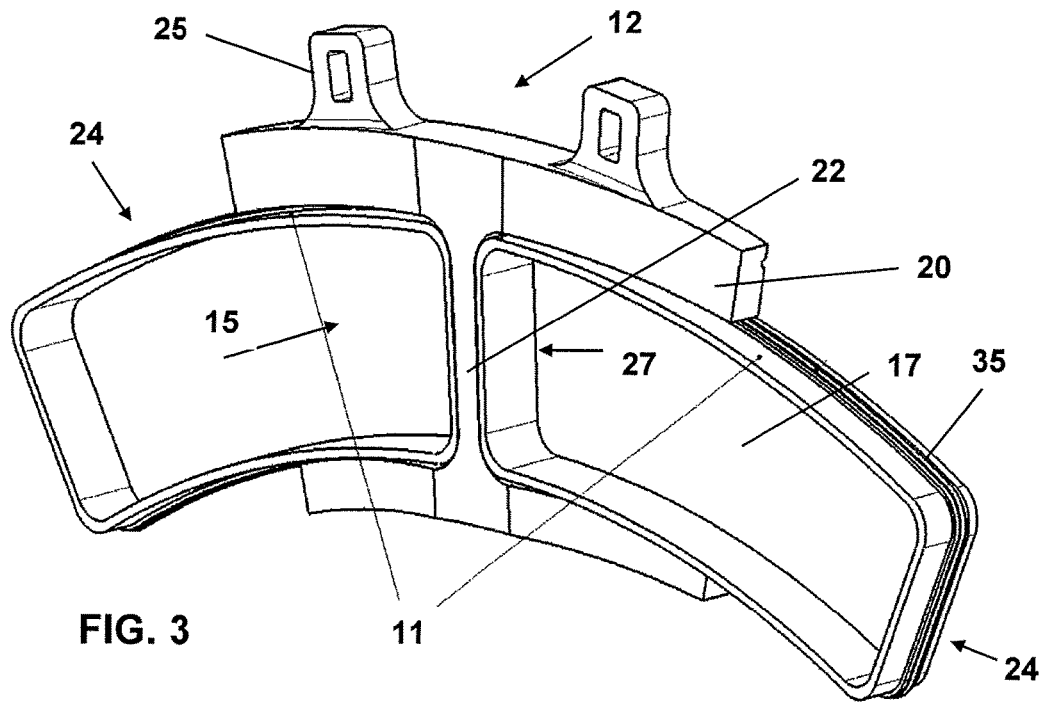
FIG. 3
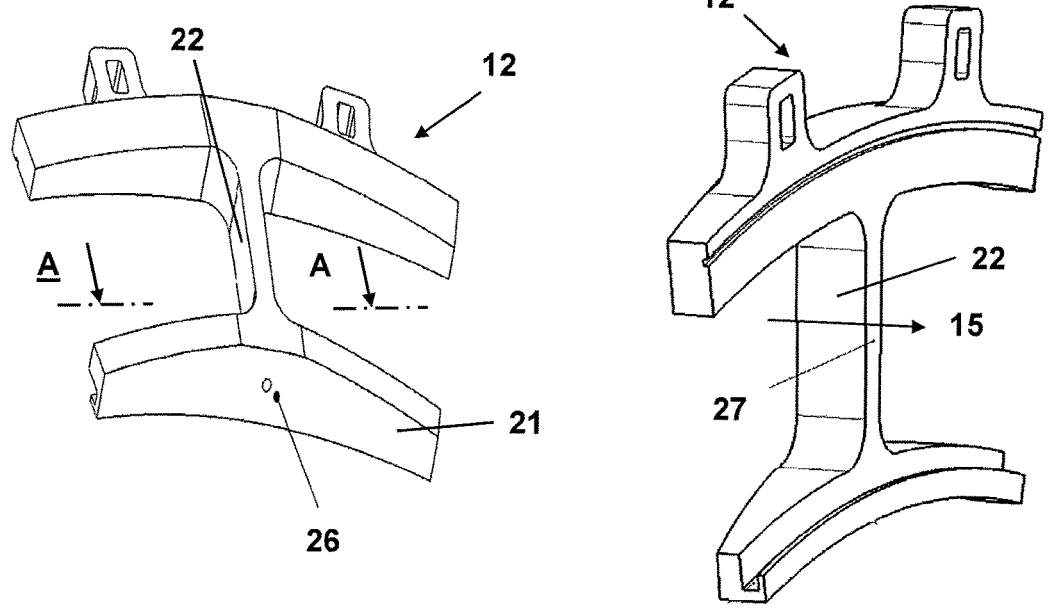
FIG. 4a
FIG. 4b

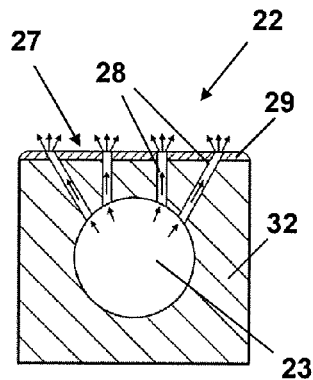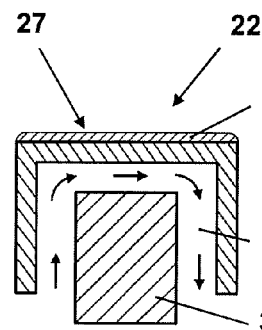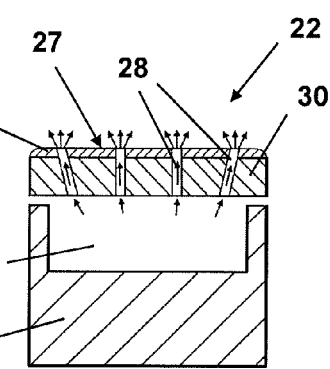
FIG. 5a    FIG. 5b    FIG. 5c
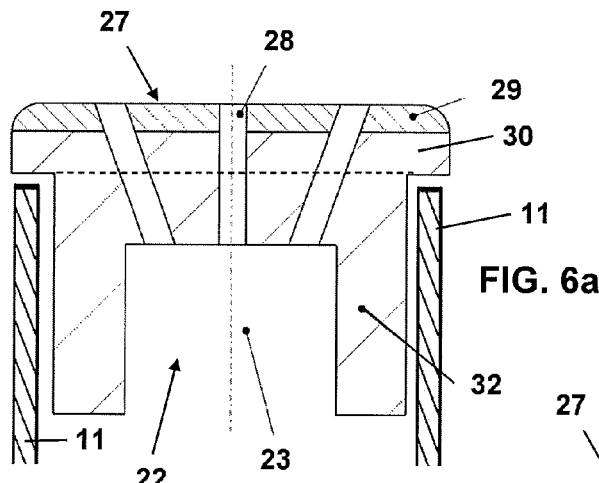
FIG. 6a
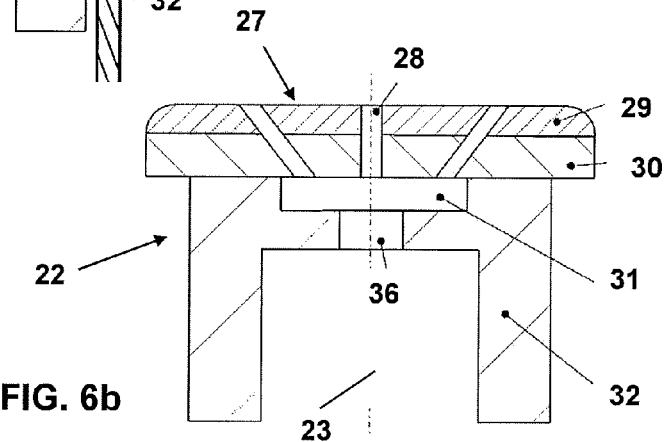
FIG. 6b

FRAME SEGMENT FOR A COMBUSTOR TURBINE INTERFACE

TECHNICAL FIELD

The invention relates to a frame segment for receiving a combustor transition piece which guides hot gases from the combustor to the turbine at the interface from a combustor to a turbine.

BACKGROUND OF THE DISCLOSURE

Gas turbines with can combustors are known from various applications in power plants. Different gas turbines with can-annular combustor arrangements are known. Typically a plurality of combustors is disposed in an annular array about the axis of the turbine. Hot combustion gases flow from each combustor through a respective transition piece into the first stage vane. In addition to relative movement, e.g. due to dynamic pulsing between these components, the transition pieces and first stage vane are made of different materials and are subjected to different temperatures during operation, thereby experiencing different degrees of thermal growth. To allow such a "mismatch" at the interface of the transition pieces and the first stage vane support frames which support and guide the transition piece at the turbine inlet have been proposed. To allow movement between the transition piece and the support frames the US 2009/0115141 A1 suggests the use of sealed slots. It teaches the use of a remaining leakage to cool the transition piece and support frame.

Leakage can change during operation and cannot be guided to effectively cool all regions of the support frame. Thus, an effective sealing cannot be applied and large amounts of cooling gas can be lost in such an arrangement.

SUMMARY OF THE DISCLOSURE

An improved frame segment is suggested in order to assure good cooling of a transition piece-turbine interface having a picture frame receptacle for axially receiving an aft end of a transition piece with minimum use of cooling gas. This invention is intended to separate the sealing from the cooling requirement. By separate cooling a good sealing which minimizes leakage for all operating conditions and a reliable cooling can be established. In addition means to reduce dynamic pulsations are proposed. Hence, lifetime is increased and power and efficiency losses due to large cooling gas consumption, as well as increased emissions due to uncontrolled cooling gas flows, are avoided.

The present disclosure relates to a combustor transition piece from a can combustor to the turbine inlet adapted to guide combustion gases in a hot gas flow path extending between a gas turbine can combustor and a first stage of turbine. The combustor transition piece comprises a duct having an inlet at an upstream end adapted for connection to the can combustor and an outlet at a downstream end adapted for connection to a first stage of a turbine. Typically each outlet is inserted into a picture frame receptacle formed by a frame segment. The downstream end comprises combustor transition walls, typically an outer wall, an inner wall, as well as two combustor transition side walls.

The inlet of a combustor transition typically has the same cross section as the can combustor to which the transition piece is attached. These can for example be a circular, an oval or a rectangular cross section. The outlet typically has the form of a segment of an annulus. A plurality of combustor transitions installed in the gas turbine form an annulus for guiding the hot gas flow into the turbine.

According to a first embodiment a frame segment for a transition piece-turbine interface has a picture frame receptacle for axially receiving an aft end of a transition piece. Typically the picture frame receptacle has a substantially rectangular cross section which can have rounded corners. A frame segment comprises an I-beam with an upper horizontal element, a lower horizontal element, and a vertical web. The upper horizontal element can have mounting face for fixation to a vane carrier. The vertical web has a downstream face, facing towards a first stage of a turbine when installed in a gas turbine. Further, the vertical web comprises a cooling gas duct for cooling the vertical web. Typically it is also supplying cooling gas to the downstream face of the vertical web.

According to one embodiment the downstream face is exposed to hot gases during operation of the gas turbine.

According to a further embodiment of the frame segment the cooling gas duct extends from the upper horizontal element to the lower horizontal element.

In another embodiment the vertical web of the frame segment is made of a U-profile with a base and two legs extending form the base wherein the base of the U-profile is the downstream face of the vertical web. The two legs delimit the cooling gas duct of web.

In a further embodiment the vertical web of the frame segment comprises a central beam which is enclosed by the U-profile. The U-profile is arranged so that a gap remains open between the central beam and the U-profile. This gap forms the cooling gas duct of the vertical web.

In yet another embodiment the vertical web of the frame segment comprises effusion cooling holes which extend from the cooling gas duct through the downstream face. These effusion cooling holes allow an efficient cooling of the downstream face.

In a further embodiment the downstream face of the vertical web is covered with a thermal barrier coating.

According to yet another embodiment the frame segment comprises a heat shield on the downstream face of the vertical web. The heat shield can be integral to the vertical web or configured as a separate part which is connected to the supporting structure of the web.

In a further embodiment the frame segment has a heat shield which is extending over the sides of the supporting structure of the vertical web in a plane parallel to the downstream face. When installed in a gas turbine the heat shield section extending over the sides of the supporting structure of the vertical web are downstream of the ends of the combustor transition piece's side walls and can also shield these combustor transition wall ends from hot gases during operation.

The heat shield can be made of a high temperature alloy or ceramic material to enhance life time and reduce cooling requirements According to yet another embodiment a cooling cavity is arranged in the supporting structure below the heat shield.

Cooling gas can for example flow substantially parallel to the lengthwise extension of the vertical web. Heat transfer enhancements such as turbolators, e.g. ribs or pins, can be arranged on the heat shield side facing the cooling cavity. The cooling cavity can also be arranged as an impingement chamber. For impingement cooling the cooling gas duct supplying the cooling gas to the cooling cavity opens towards the cooling cavity to impingement cool the heat shield.

In another embodiment a cooling gas supply hole is radially extending from the cooling gas duct through at least one of the upper horizontal element, and the lower horizontal element. Cooling gas can be feed to the cooling channel of the vertical web through the cooling gas supply hole.

According to a further embodiment the frame segment comprises a web extension. The web extension is a part of the vertical web or attached to the vertical web and extends in axial direction beyond the downstream end of the transition piece. When installed in a gas turbine the web extension of a vertical web is extending downstream into a space between the inner and outer platform of a vane the turbine's first stage. The axial extension can for example be substantially parallel to the combustor transition side wall. It can also be curved or inclined in the direction of the curvature of the subsequent vane.

The cooling channel of the vertical web can have a defined volume and a neck connecting the volume to the hot gas flow wherein the length of the neck, the cross section of the neck and the volume of the cooling channel are configured as a Helmholtz damper for damping pressure pulsations in the hot gas flow during operation of the gas turbine. Depending on the vertical web's material and thermal barrier coating as well on the expected operating conditions the cooling flow can be limited to a purge flow.

When installed the web extension can end directly upstream of an airfoil of the first stage vane. The web extension and the subsequent airfoil can be arranged such that their surfaces are aligned to form one smooth surface facing the hot gas flow path.

Further, a gas turbine comprising such a frame segment is an object of the disclosure. The proposed gas turbine has at least one compressor, at least one turbine, and at least one can combustor with a transition piece and a frame segment according to the disclosure which is installed upstream of the first vane and configured to receive the downstream end of the transition piece.

The above described combustor transition, can combustor and gas turbine can be a single combustion gas turbine or a sequential combustion gas turbine as known for example from EP 0 620 363 B1 or EP 0 718 470 A2. It can also be a combustor transition of a gas turbine with one of the combustor arrangements described in the WO 2012/136787.

BRIEF DESCRIPTION OF THE DRAWING

The invention, its nature as well as its advantages, shall be described in more detail below with the aid of the accompanying drawings. Referring to the drawings:

FIG. 1b shows the cross section b-b of the turbine inlet with combustor transitions of the gas turbine from FIG. 1a.

FIG. 3 shows an example of a frame segment with two transition pieces inserted.

FIGS. 4a. and 4b show a perspective views of a frame segment.

FIGS. 5a, 5b, and 5c show examples of cross sections A-A of the vertical web of frame segment of FIG. 4 with different cooling arrangements.

FIGS. 6a, and 6b show examples of cross sections A-A of the vertical web of frame segment of FIG. 4 with different cooling arrangements and a heat shield extending over the supporting structure of the vertical web.

EMBODIMENTS OF THE DISCLOSURE

The same or functionally identical elements are provided with the same designations below. The examples do not constitute any restriction of the invention to such arrangements.

Figure 1A:
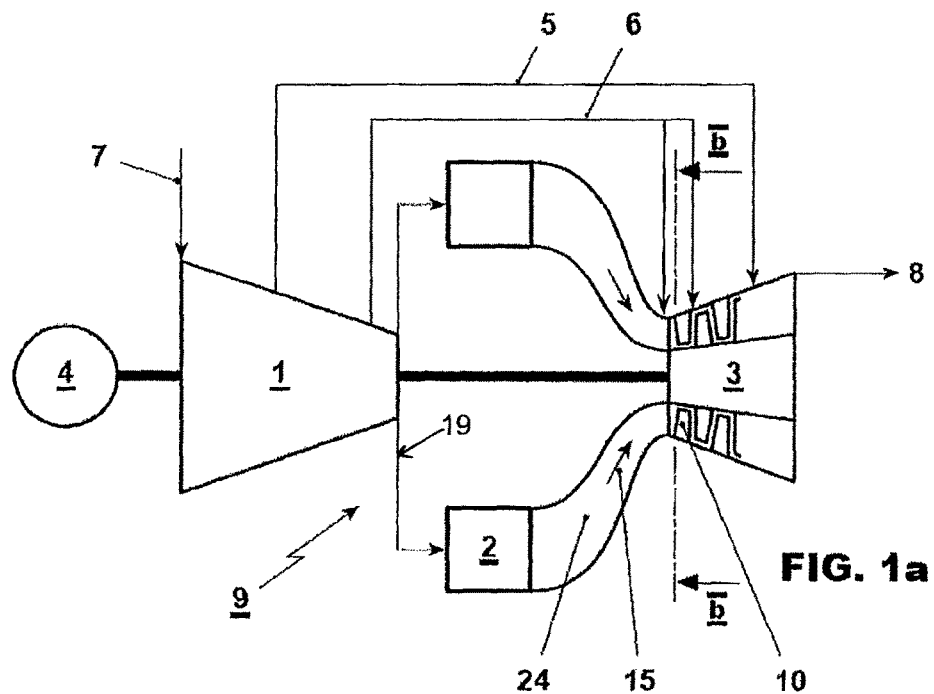
FIG. 1a shows an example of a gas turbine according to the present invention.

An exemplary arrangement is shown in FIG. 1a. The gas turbine 9 is connected to the power generator 4. The gas turbine 9 is supplied with compressor inlet gas 7. In the gas turbine 9 a compressor 1 feeds gas 19 for combustion to a combustion chamber comprising a plurality of can combustors 2. Hot combustion gases are fed into a turbine 3 via a plurality of combustor transition pieces 24. The can combustors 2 and combustor transition pieces 24 form a hot gas flow path 15 leading to the turbine 3. The combustor transition pieces 24 connect the can combustors 2 of the combustion chamber with the first stage vane 10 of the turbine 3.

Cooling gas 5, 6 is branched off from the compressor 1 to cool the turbine 3, the combustor 2 (not shown) and a frame segment (not shown in FIG. 1). In this example the cooling systems for high pressure cooling gas 6 and low pressure cooling gas 5 are indicated.

Exhaust gas 8 leaves the turbine 3. The exhaust gas 8 is typically used in a heat recovery steam generator to generate steam for cogeneration or for a water steam cycle in a combined cycle (not shown).

Figure 1B:
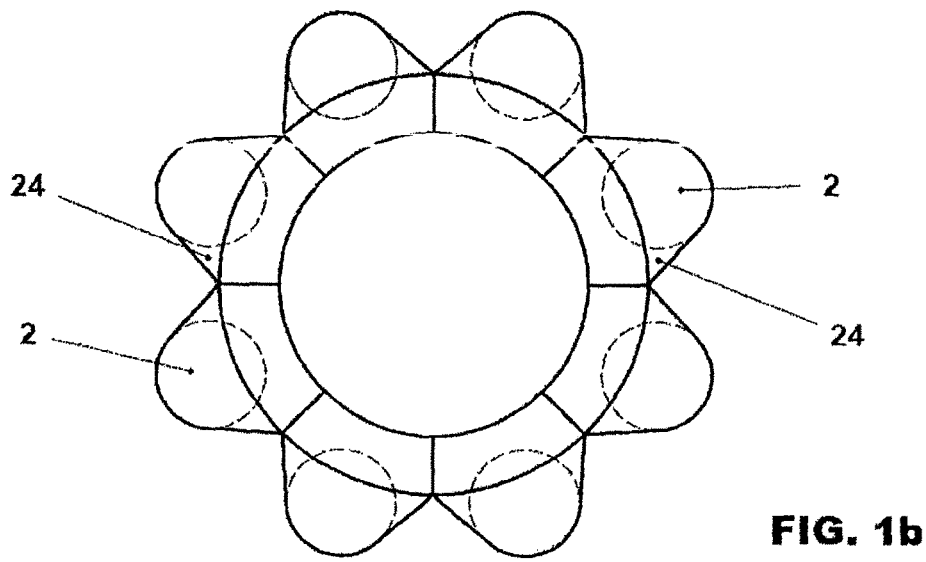

The combustor transition pieces 24 of the gas turbine 9 of the cross section B-B are shown in FIG. 1b. The combustor transition pieces 24 guide the hot gases from the can combustors 2 to the turbine 3 and are arranged to form an annular hot gas duct at the turbine inlet.

Figure 1C:
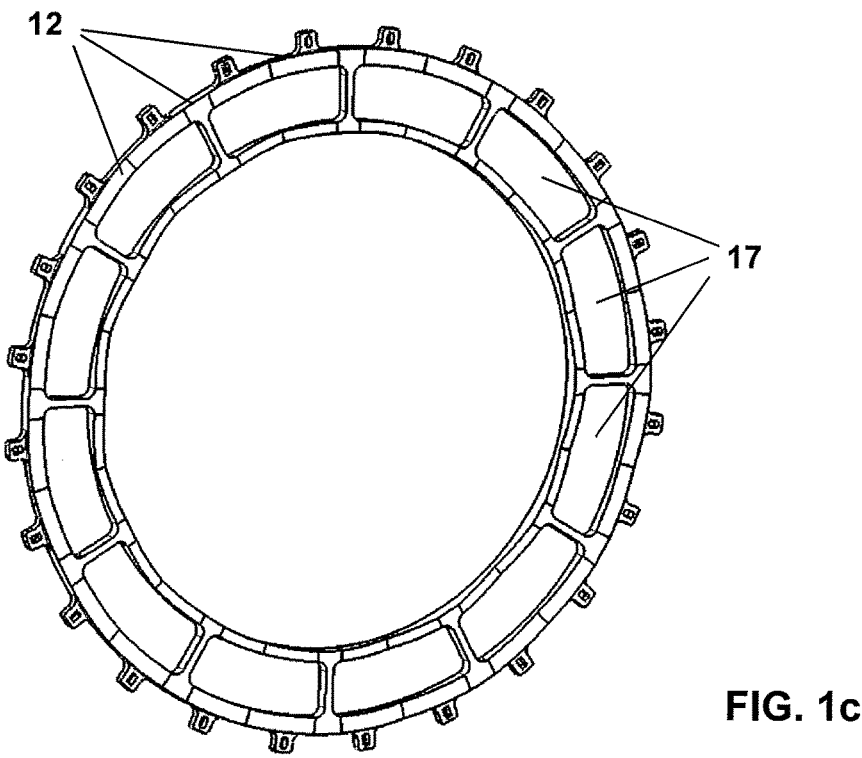
FIG. 1c shows an example of an annular arrangement of frame segments for receiving the aft ends of the transition pieces shown in FIG. 1b.

FIG. 1c shows an example of an annular arrangement of frame segments 12 for receiving the aft ends of the combustor transition pieces 24. Neighboring pairs of frame segments 12 form a picture frame receptacle 17 which can receive an aft end or outlet of a combustor transition piece (not shown).

Figure 2:
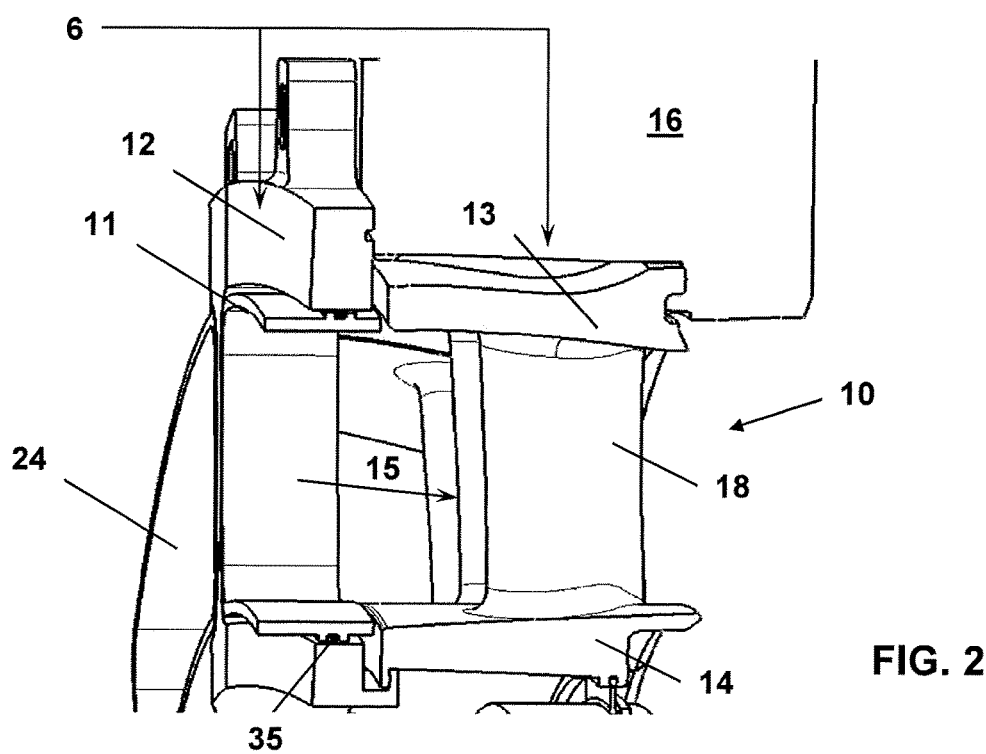
FIG. 2 shows the outlet of a combustor transition piece inserted in a frame segment together with a supporting vane carrier and a vane one of a turbine.

An example for the interface between combustor transition piece 24 and the first stage vane 10 of a turbine 3 is shown in more detail in FIG. 2. The combustor transition piece 24 is defined by the combustor transition wall 11, which confines the hot gas flow path 15. At the outlet of the combustor transition piece 24 the cross section of each combustor transition piece has the geometrical shape of a sector of the annulus, which forms the hot gas flow path 15 at the turbine inlet. The hot gas flow path 15 continues into the space between the first stage vanes 10 of the turbine 3. The inner platforms 14 and outer platforms 13 delimit the hot gas flow path 15 in the turbine inlet. The airfoils 18 of the turbine vanes 10 extend in radial direction between the inner platform 14 and outer platform 13 of the vane 10 and at least partly divide the hot gas flow path 15 in the circumferential direction. At the outlet to the turbine (also called aft end) the transition pieces 24 are supported and kept in their position by frame segments 12. The frame segments 12 and the first stage vanes 10 are supported by and fixed to a vane carrier 16. High pressure cooling gas can be supplied to the frame segments 12 and first stage vanes 10. A seal 35 is arranged between the outside of the combustor transition wall 11 and the receiving frame segments 12. The gap between the combustor transition wall 11 and the receiving frame segments 12 is typically pressurized with cooling gas. The seal 35 prevents unnecessary loss of cooling gas through this gap into the hot gas flow path 15.

FIG. 3 shows a perspective view of an example of a frame segment 12 with two combustor transition pieces 24 inserted. The frame segment 12 consist of a vertical web 22 with an upper horizontal element 20 arranged radially outside of the vertical web 22, and a lower horizontal element 21 arranged radially inside of the vertical web 22 when installed in a gas turbine. The frame segment 12 comprises two ears 25 for fixation to a vane carrier. They extend in radial direction from the upper horizontal element 20. The vertical web 22 has a downstream face 27. The combustor transition pieces 24 open in flow direction on both sides of the downstream face 27.

FIGS. 4a and 4b show perspectives view of a frame segment 12. As shown in FIG. 4a a cooling gas supply hole is arranged in the lower horizontal element 21 extending into the vertical web 22. FIG. 4b shows the vertical web 22 with the downstream face 27 facing in the direction of the hot gas flow path 15.

FIG. 5a shows a first example of a cross section A-A of the vertical web of the frame segment of FIG. 4. The vertical web of FIG. 5a has a supporting structure 32 with a rectangular cross section and a central cooling gas duct 23. From the central cooling gas duct 23 effusion cooling holes 28 extend to the downstream face 27 of the vertical web 22 to effusion cool the downstream face 27. The effusion cooling holes 28 open through a thermal barrier coat 29 which is applied on the supporting structure 32 at the downstream face 27 of the vertical web 22.

FIG. 5b shows a second example of a cross section A-A of the vertical web of the frame segment of FIG. 4. The vertical web of FIG. 5b comprises a solid central beam with a rectangular cross section as supporting structure 32. The central beam is enclosed by the U-profile. A gap remains between the central beam and the U-profile. The gap between the supporting structure 32 and the U-profile forms the cooling gas duct 23. On the downstream face 27 of the U-profile a thermal barrier coat 29 is applied. Optionally the downstream face 27 can be effusion cooled (effusion cooling holes 28 extending through the downstream face 27 are not shown here). A closed cooling system can also be used. This is for example advantageous for a steam cooling. Typically In open loop cooling systems cooling air is typically used as cooling gas.

FIG. 5c shows a third example of a cross section A-A of the vertical web of the frame segment of FIG. 4. Here, the vertical web 22 comprises a supporting structure 32 which has a cooling gas duct 23 extending along the downstream side. The cooling gas duct is closed towards the downstream face 27 by a heat shield 30, which is shielding the supporting structure 32 from hot gas. The heat shield 30 can be made of a high temperature resistant material. On the downstream face 27 of the heat shield 30 a thermal barrier coat 29 is applied. The downstream face 27 can be effusion cooled. From the cooling gas duct 23 effusion cooling holes 28 extend to the downstream face 27 through the heat shield 30 and the thermal barrier coat 29.

FIG. 6a shows a first example of a cross section A-A of the vertical web of frame segment of FIG. 4 with a heat shield extending over the supporting structure of the vertical web 22. The heat shield 30 is extending in a plane parallel to the downstream face 27. In this example the supporting structure 32 has the shape of a U-profile which is open in a direction facing away from the downstream face 27. The opening between the legs of the U-profile delimits the cooling gas duct 23. From the cooling gas duct 23 effusion cooling holes 28 extend to the downstream face through the base of the U-profile and the heat shield 30 which is covered by a thermal barrier coat 29. On the sides of supporting structure 32 the downstream ends of the combustor transition wall 11 of the transition piece are indicated. Their downstream ends of the combustor transition wall 11 are covered by the overlap formed by the extension of the heat shield 30, which is protecting the ends from hot gas during operation. The combustor transition walls 11 themselves can be covered by thermal barrier coating and can be cooled (not shown). In this example the heat shield 30 and supporting structure 32 are made of one piece.

FIG. 6b shows a second example of a cross section A-A of the vertical web of frame segment of FIG. 4 with a heat shield extending over the supporting structure of the vertical web 22. It is based on the example of FIG. 6a. However, the heat shield 30 is made of a separate piece. In addition a cooling cavity 31 is arranged in supporting structure 32 of the vertical web 22 below the heat shield 30. It is extending parallel to the surface of the supporting structure 32 in a direction from the lower to the upper horizontal element. Cooling gas is feed to the cooling cavity 31 through with cooling gas from the cooling gas duct 23 via supply holes 36.

Figure 7:
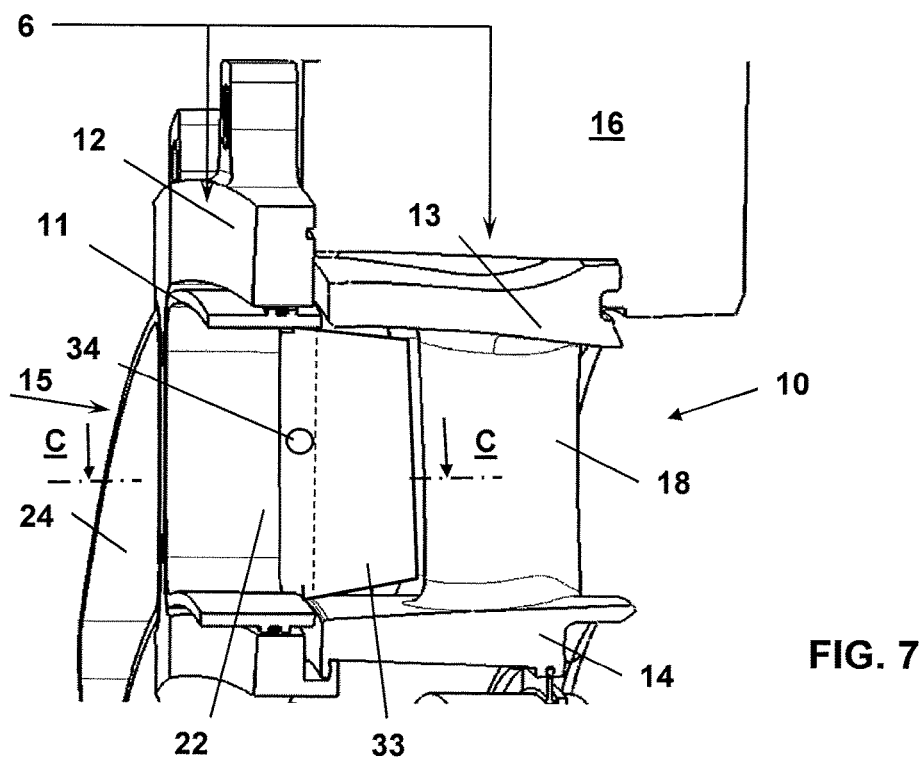
FIG. 7 shows an example of a frame segment with a web extension.

FIG. 7 is based on FIG. 2 showing the interface between combustor transition piece 24 and the vane 10 of a turbine 3. In this example the vertical web 22 of the frame segment comprises a web extension 33 which extends parallel to the combustor transition wall 11 in an axial direction beyond the downstream end of the combustor transition wall 11 into a space delimited by the outer platform 13 and inner platform 14 of vane 10. To separate the hot gas flow path 15 into acoustically decoupled sections the web extension 33 is reaching into the upstream end of the turbine 3, extending into the space confined by the inner platform 14 and outer platform 13. In this case the web extension 33 ends upstream of the leading edge of the airfoil 18.

The vertical web 22 with the web extension 33 can be hollow comprising a resonator volume. The resonator volume is fluidly connected the hot gas flow path 15 by at least one neck 34 which is designed as a neck 34 of a Helmholtz damper. In particular the cross sectional area of at least one resonator cooling gas supply hole 26 can be adjusted such that in combination with the volume at least one critical frequency can be dampened.

Thus decoupling of neighboring combustors can be achieved by a combination of dampening with the Helmholtz damper and by at least partly blocking the fluid connection between two neighboring combustors. Since the flow velocity in the first stage vane typically can reach the speed of sound and coupling of two combustors via the downstream areas of the first stage vane 10 is not possible. As shown in FIG. 7 typically a gap can remain between the airfoil 18 and the web extension 33 to allow for axial movements to thermal expansions in the turbine and in the combustor. Typically, the airfoil 18 and web extension 33 should not touch each other to avoid mechanical damage of the parts, in particular of a coating or thermal barrier coating which can be applied to the surface of the parts.

Figure 8:
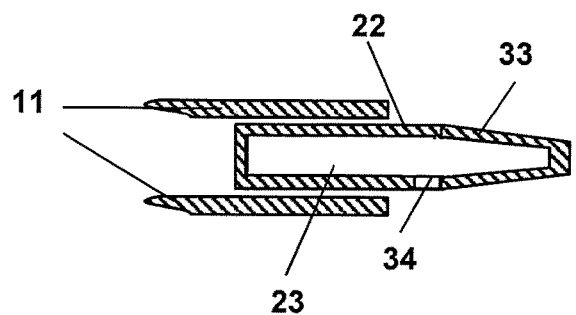
FIG. 8 shows the cross section C-C of the web extension of FIG. 7.

FIG. 8 shows the cross section C-C of the web extension of FIG. 7. In this example the vertical web 22 and web extension 33 enclose one volume which is used as resonator volume and as cooling gas duct for cooling of the vertical web 22 including the web extension 33. The vertical web 22 is located between the downstream ends of the combustor transition walls 11.

The web extension 33 can be closed in radial direction by end plates. The end plates can be an integral part of the vertical web 22, for example in a casted, bended, pressed or forged piece. The web extension 33 can also be attached or fixed to the vertical web 22, for example by welding, brazing, screws or rivets.

Naturally the features described may be independently provided from one another. For example, the features of each of the attached claims can be applied independently of the features of the other claims.

LIST OF DESIGNATIONS

1 Compressor
2 Can combustor
3 Turbine
4 Generator
5 Low pressure cooling gas
6 High pressure cooling gas
7 Compressor inlet gas
8 Exhaust gas
9 Gas turbine
10 Vane
11 Combustor transition wall
12 Frame segment
13 Outer platform
14 Inner platform
15 Hot gas flow path
16 Vane carrier
17 Picture frame receptacle
18 Airfoil
19 Gas for combustion
20 Upper horizontal element
21 Lower horizontal element
22 Vertical web
23 Cooling gas duct
24 Combustor transition piece
25 Ear
26 Cooling gas supply hole
27 Downstream face
28 Effusion cooling hole
29 Thermal barrier coat
30 Heat shield
31 Cooling cavity
32 Supporting structure
33 Web extension
34 Neck
35 Seal
36 Supply holes

The invention claimed is:

1. A frame segment for receiving an aft end, in a hot gas flow path direction, of a combustor transition piece for a gas turbine, the frame segment comprising:
   an I-beam with an upper horizontal element, a lower horizontal element, and a vertical web extending between the upper horizontal element and the lower horizontal element, wherein the vertical web is made of a U-profile with a base and two legs extending from the base wherein the base of the U-profile is a downstream face of the vertical web in the hot gas flow path direction, and wherein the two legs delimit a cooling gas duct.

2. The frame segment according to claim 1, wherein the vertical web comprises:
   a central beam which is enclosed by the U-profile, and wherein a gap between the central beam and the U-profile forms the cooling gas duct.

3. The frame segment according to claim 2, wherein a cooling cavity is arranged as an impingement chamber and wherein the cooling gas duct opens towards the cooling cavity to impingement cool a heat shield.

4. The frame segment according to claim 1, comprising:
   a web extension configured to extend parallel to a combustor transition side wall in an axial direction beyond the downstream end of the combustor transition piece and into an upstream end of a turbine.

5. The frame segment according to claim 1, wherein the cooling gas duct has a defined volume and a neck configured as a Helmholtz damper.

6. The frame segment according to claim 1, wherein the cooling gas duct extends from the upper horizontal element to the lower horizontal element.

7. The frame segment according to claim 1, wherein the vertical web comprises:
   effusion cooling holes extending from the cooling gas duct through the downstream face.

8. The frame segment according to claim 1, wherein the downstream face is covered with a thermal barrier coating.

9. The frame segment according to claim 1, comprising:
   a heat shield on the downstream face.

10. The frame segment according to claim 9, wherein the heat shield extends over sides of a supporting structure of the vertical web in a plane parallel to the downstream face.

11. The frame segment according to claim 9, wherein the heat shield is made of a high temperature alloy or ceramic material.

12. The frame segment according to claim 9, wherein a cooling cavity is arranged in the vertical web behind the heat shield.

13. The frame segment according to claim 2, wherein a cooling gas supply hole is radially extending from the cooling gas duct through the upper horizontal element and/or the lower horizontal element.

14. A gas turbine with at least one compressor, at least one turbine, and at least one combustion chamber with a combustor transition piece, comprising:
   the frame segment according to claim 1.

15. The frame segment according to claim 2, comprising:
   a web extension configured to extend parallel to a combustor transition side wall in an axial direction beyond the downstream end of the combustor transition piece and into an upstream end of a turbine.

16. The frame segment according to claim 2, wherein the cooling gas duct has a defined volume and a neck configured as a Helmholtz damper.

17. The frame segment according to claim 2, wherein the cooling gas duct extends from the upper horizontal element to the lower horizontal element.

18. The frame segment according to claim 2, wherein the vertical web comprises:
   effusion cooling holes extending from the cooling gas duct through the downstream face.

19. The frame segment according to claim 2, wherein the downstream face is covered with a thermal barrier coating.

20. The frame segment according to claim 2, comprising:
   a heat shield on the downstream face.

* * * * *